United States Patent [19]

Kobayashi et al.

[11] Patent Number: 4,642,324
[45] Date of Patent: Feb. 10, 1987

[54] VINYL CHLORIDE RESIN COMPOSITION

[75] Inventors: Toshiaki Kobayashi; Hiromichi Arakawa, both of Yokohama; Tatsuo Ohira, Tokyo, all of Japan

[73] Assignee: Nippon Zeon Co., Ltd., Tokyo, Japan

[21] Appl. No.: 701,499

[22] Filed: Feb. 14, 1985

[30] Foreign Application Priority Data

Feb. 16, 1984 [JP] Japan ................................. 59-27622
Feb. 17, 1984 [JP] Japan ................................. 59-28319

[51] Int. Cl.$^4$ ............................................ C08L 31/00
[52] U.S. Cl. ................................. 524/559; 525/329.5; 525/329.6
[58] Field of Search .................... 525/329.6, 329.5; 524/559

[56] References Cited

U.S. PATENT DOCUMENTS

| | | | |
|---|---|---|---|
| 2,416,874 | 3/1947 | Howk et al. | 525/329.6 |
| 3,068,210 | 12/1962 | Douglas | 525/329.5 |
| 3,322,734 | 5/1967 | Rees | 525/329.6 |
| 3,804,814 | 4/1974 | Fassy et al. | 525/329.5 |
| 3,972,847 | 8/1976 | Bernhardt et al. | 525/329.5 |
| 3,981,846 | 9/1976 | Freytag et al. | 525/329.6 |

FOREIGN PATENT DOCUMENTS 7106147  11/1971  Netherlands .................... 525/329.6

Primary Examiner—Joseph L. Schofer
Assistant Examiner—N. Sarofim
Attorney, Agent, or Firm—Sherman and Shalloway

[57] ABSTRACT

A vinyl chloride resin composition comprising a copolymer derived from 70 to 99.8% by weight of vinyl chloride, 0.2 to 30% by weight of a monoester of an alpha, beta-unsaturated dicarboxylic acid, 0 to 2% by weight of a compound having two or more active double bonds in the molecule and 0 to 20% by weight of another vinyl compound, a mono- or divalent metal compound and a plasticizer.

12 Claims, No Drawings

VINYL CHLORIDE RESIN COMPOSITION

This invention relates to a vinyl chloride resin composition, and more specifically, to a vinyl chloride resin composition comprising a copolymer of vinyl chloride with a monoester of an alpha,beta-unsaturated dicarboxylic acid, a mono- or divalent metal compound and a plasticizer.

Vinyl chloride resins are typical synthetic resins being available at relatively low cost and having well-balanced properties, and in rigid to flexible formulations, find extensive use. Particularly, flexible vinyl chloride resin articles having a rubbery feel obtained by molding vinyl chloride resins containing large amounts of plasticizers are superior to vulcanized rubbers in regard to cost, moldability, weatherability, coloration, etc., and are used in a wide range of applications. Since, however, these articles have lower creep characteristics at high temperatures than vulcanized rubber, attempts have been made heretofore to improve creep characteristics by using vinyl chloride resins having a high degree of polymerization or containing a gel. These techniques, however, have a limit in improving creep characteristics at temperatures of 100° C. or higher, and the application of such techniques to fields which are likely to encounter high temperatures of 100° C. or higher is limited.

In view of the foregoing state of the art, the present inventors made various investigations in order to improve the high-temperature creep characteristics of vinyl chloride resins by, for example, modifying them or imparting a new function thereto. These investigations have led to the discovery that markedly improved creep characteristics at high temperatures can be provided by using a vinyl chloride resin composition comprising a copolymer derived from 70 to 99.8% by weight of vinyl chloride, 0.2 to 30% by weight of a monoester of an alpha,beta-unsaturated dicarboxylic acid, 0 to 2% by weight of a compound having two or more active double bonds in the molecule and 0 to 20% by weight of another vinyl compound, a mono- or divalent metal compound and a plasticizer.

The copolymer used in this invention is obtained by ordinary methods of producing vinyl chloride resins, such as suspension and emulsion polymerization techniques. Examples of the monoester of an alpha,beta-unsaturated dicarboxylic acid, one component of the copolymer, include monoesters of maleic acid, fumaric acid, itaconic acid and citraconic acid, such as monomethyl maleate, monoethyl maleate, monobutyl maleate, monomethyl itaconate and monoethyl itaconate. Examples of the compound having two or more active double bonds in the molecule include diallyl phthalate, diallyl maleate, diallyl adipate, diallyl ether, triallyl cyanurate, ethylene glycol divinyl ether, ethylene glycol dimethacrylate and trimethylol propane trimethacrylate. Examples of the other vinyl compound are ethylene, propylene, vinyl acetate, vinylidene chloride, vinyl ether, acrylic esters and methacrylic esters.

Examples of the mono- or divalent metal compound used in this invention as an ionic crosslinking agent include compounds of metals such as $Li^+$, $Na^+$, $K^+$, $Cs^+$, $Mg^{++}$, $Ca^{++}$, $Ba^{++}$, $Zn^{++}$, and $Cd^{++}$, such as oxides, hydroxides, carboxylic acid salts (e.g., acetates, propionate, octylates, caprates, stearates and naphthenates), thiocarboxylic acid salts, sulfonic acid salts and phosphoric acid salts of these metals, and complex salts between the aforesaid metals and acetylacetone. These metal compounds may be used singly or in combination. The metal compounds are preferably water-insoluble because moisture absorption and foaming by moisture absorption can be avoided.

Plasticizers generally used in flexible formulations of vinyl chloride resins can be used in this invention. Examples include phthalic acid esters such as di-2-ethylhexyl phthalate, di-n-octyl phthalate, diisodecyl phthalate, dibutyl phthalate and dihexyl phthalate; linear dibasic acid esters such a dioctyl adipate and dioctyl sebacate; polyester-type polymeric plasticizers such as trimellitic acid esters; epoxy plasticizers such as epoxidized soybean oil and epoxidized linseed oil; and phosphate ester-type plasticizers such as triphenyl phosphate and tricresyl phosphate. These plasticizers may be used singly or in combination.

The proportion of the monoester of an alpha,beta-unsaturated dicarboxylic acid in the copolymer used in this invention is 0.2 to 30% by weight, preferably 0.5 to 15% by weight. If this proportion is less than 0.2% by weight, the copolymer does not exhibit a sufficient effect on high-temperature creep characteristics. If it exceeds 30% by weight, the properties of the copolymer as a vinyl chloride resin are deteriorated, and there are many restrictions on the production of such a copolymer.

The high-temperature creep characteristics are further improved by using a compound having two or more active double bonds in the molecule in place of part of the monoester of an alpha,beta-unsaturated dicarboxylic acid. The proportion of this compound is 0 to 2% by weight, preferably 0.05 to 1% by weight, based on the total amount of the copolymer. If it exceeds 2% by weight, the processability of the resulting composition is undesirably reduced.

The amount of the monovalent or divalent metal compound added is preferably 0.1 to 3 molar equivalents per mole of the carboxylic acid in the vinyl chloride copolymer. If it is less than 0.1 molar equivalent, a sufficient ionic crosslinking effect is not produced. When it is added in an amount of more than 3 molar equivalents, the ionic crosslinking effect is not further increased, and it is wasteful.

The amount of the plasticizer used in this invention is properly selected according to the hardness of the desired product. For a flexible rubbery product, it is 20 to 300 parts by weight, preferably 30 to 200 parts by weight, per 100 parts by weight of the vinyl chloride copolymer. If it is less than 20 parts by weight, a flexible and rubbery product cannot be obtained. If it exceeds 300 parts, it is difficult to improve creep characteristics at high temperatures.

The vinyl chloride resin composition of this invention can, as required, include various additives such as stabilizers, lubricants, fillers, antioxidants, ultraviolet absorbers, processing aids, blowing agents, pigments, fire retardants and impact resisting aids as in the case of general vinyl chloride resins. Or it may include another polymer.

An ionically crosslinked article can be obtained by molding the composition in accordance with usual methods of processing vinyl chloride resins, such as extrusion molding, compression molding, calender molding, blow molding and injection molding. Since the molded article has very good heat resistance and elasticity, it can be suitably used in fields requiring such properties, for exmple as automotive windshield materials, sheaths of electric wires and cables, and packings.

The following examples illustrate the present invention in greater detail. All parts in these examples are by weight unless otherwise specified.

EXAMPLE 1

A 10-liter autoclave was charged with 250 parts of deionized water, 0.2 part of partially saponified polyvinyl alcohol (saponification degree 70%, average degree of polyerization 500), 0.17 part of di-2-ethylhexyl peroxydicarbonate, and each of the comonomers shown in Table 1. The inside of the autoclave was deaerated, and vinyl chloride was added. With stirring, the temperature was raised to 40° C., and the monomers were polymerized for 20 hours. After the polymerization, the contents of the autoclave were taken out, dehydrated and dried to give a vinyl chloride resin having the composition shown in Table 1.

The vinyl chloride resin was kneaded on a roll at 150° C. for 5 minutes in accordance with the compounding recipe shown in Table 2. The resulting sheet was hot-pressed at 160° C. for 10 minutes to form a press sheet having a predetermined thickness.

The creep characteristics of the press sheet at a temperature of at least 100° C. were evaluated by a heat distortion test and a rebound test. Heat distortion was tested in accordance with JIS K-6723. Specifically, a load of 1 kg was exerted on the press sheet at a temperature of 120° C., and the percentage of distortion was determined one hour later. Rebound was tested by using a Dunlop trypsometer in accordance with BS903 Part AS:1963, and the rebound (%) at 110° C. was determined. The results are shown in Table 1.

TABLE 1

| Run No. | Composition (wt. %) of vinyl chloride resin | | Average degree of polymerization of vinyl chloride resin | Amount (parts) of magnesium acetylacetonate | Heat distortion (%) | Rebound (%) |
| --- | --- | --- | --- | --- | --- | --- |
| | Vinyl chloride | Comonomer | | | | |
| Invention | | | | | | |
| 1 | 90 | Monomethyl maleate 10 | 1,350 | 8.6 | 2 | 42 |
| 2 | 90 | Monoethyl maleate 10 | 1,200 | 7.8 | 2 | 45 |
| 3 | 90 | Monobutyl maleate 10 | 1,000 | 6.5 | 3 | 39 |
| 4 | 90 | Monomethyl fumarate 10 | 1,300 | 8.6 | 3 | 38 |
| 5 | 90 | Monomethyl itaconate 10 | 1,450 | 7.8 | 2 | 41 |
| 6 | 90 | Monoethyl itaconate 10 | 1,300 | 7.1 | 3 | 40 |
| 7 | 80 | Monomethyl maleate 20 | 850 | 17.2 | 3 | 44 |
| 8 | 97 | Monomethyl maleate 3 | 1,800 | 2.6 | 6 | 32 |
| 9 | 85 | Monomethyl maleate 10 Vinyl acetate 5 | 1,200 | 8.6 | 4 | 36 |
| 10 | 90 | Monomethyl maleate 10 | 1,350 | 2 | 7 | 28 |
| 11 | 90 | Monomethyl maleate 10 | 1,350 | 5 | 4 | 37 |
| 12 | 90 | Monomethyl maleate 10 | 1,350 | 20 | 2 | 45 |
| Comparison | | | | | | |
| 1 | 99.9 | Monomethyl maleate 0.1 | 2,300 | 2 | 10 | 15 |
| 2 | 90 | Monomethyl maleate 10 | 1,350 | — | 20 | 5 |
| 3 | 100 | — | 1,350 | — | 15 | 5 |
| 4 | 100 | — | 1,350 | 10 | 18 | 3 |

TABLE 2

| | |
| --- | --- |
| Vinyl chloride resin | 100 parts |
| Magnesium acetylacetonate | See Table 1 |
| Di-2-ethylhexyl phthalate | 100 parts |
| Dibutyltin maleate | 4 parts |

EXAMPLE 2

Example 1 was repeated except that the compounding recipe shown in Table 3 was used instead of that shown in Table 2. The results are shown in Table 4.

TABLE 3

| | |
| --- | --- |
| Vinyl chloride resin (vinyl chloride 95/monomethyl maleate 5) | 100 parts |
| Ionic crosslinking agent | See Table 4 |
| Plasticizer | See Table 4 |
| Stabilizer (dibutyltin maleate) | 4 parts |

TABLE 4

| Run No. | Ionic crosslinking agent | | Plasticizer | | Heat distortion (%) | Rebound (%) |
| --- | --- | --- | --- | --- | --- | --- |
| | Type | Amount | Type | Amount | | |
| Invention | | | | | | |
| 13 | Magnesium acetylacetonate | 4.3 | Di-2-ethylhexyl phthalate | 100 | 4 | 35 |
| 14 | Zinc acetylacetonate | 5.1 | " | 100 | 4 | 36 |
| 15 | Calcium stearate | 11.7 | " | 100 | 8 | 31 |
| 16 | Zinc octylate | 6.8 | " | 100 | 7 | 32 |
| 17 | Barium hydroxide | 3.3 | " | 100 | 5 | 28 |
| 18 | Calcium hydroxide | 1.5 | " | 100 | 6 | 30 |
| 19 | Sodium hydroxide | 1.6 | " | 100 | 5 | 22 |
| 20 | Zinc oxide | 1.6 | " | 100 | 9 | 20 |
| 21 | Magnesium acetylacetonate | 4.3 | " | 50 | 1 | 50 |
| 22 | " | 4.3 | " | 120 | 5 | 25 |
| 23 | " | 4.3 | Diisodecyl phthalate | 100 | 2 | 41 |
| 24 | " | 4.3 | Dibutyl phthalate | 100 | 5 | 27 |

TABLE 4-continued

| Run No. | Ionic crosslinking agent Type | Amount | Plasticizer Type | Amount | Heat distortion (%) | Rebound (%) |
|---|---|---|---|---|---|---|
| 25 | " | 4.3 | Trioctyl trimellitate | 100 | 3 | 34 |
| 26 | " | 4.3 | PN-250* | 100 | 3 | 31 |
| 27 | " | 4.3 | Di-2-ethylhexyl phthalate | 50 | 7 | 29 |
|  |  |  | Dioctyl adipate | 50 |  |  |
| 28 | " | 4.3 | Di-2-ethylhexyl phthalate | 80 | 5 | 33 |
|  |  |  | Epoxidized soybean oil | 20 |  |  |
| 29 | " | 4.3 | Di-2-ethylhexyl phthalate | 80 | 6 | 32 |
|  |  |  | Tricresyl phosphate | 20 |  |  |
| Comparison |  |  |  |  |  |  |
| 5 | — | — | Di-2-ethylhexyl phthalate | 100 | 16 | 8 |

*Polyester-type polymeric plasticizer produced by Adeka-Argus Company.

EXAMPLE 3

Example 1 was repeated except that each of the resins shown in Table 5 was used instead of the vinyl resin used in Example 1. The results are shown in Table 5.

TABLE 5

| Run No. | Composition (wt. %) of vinyl chloride resin | | | | Amount (parts) of magnesium acetyl-acetonate | Heat distortion (%) | Rebound (%) |
|---|---|---|---|---|---|---|---|
|  | Vinyl chloride | Comonomer I | | Comonomer II | | | |
| Invention |  |  |  |  |  |  |  |
| 30 | 94.8 | Monomethyl maleate | 5.0 | Diallyl phthalate | 0.2 | 4.3 | 1.5 | 50 |
| 31 | 92.6 | Monobutyl itaconate | 7.2 | " | " | 6.2 | 2 | 51 |
| 32 | 94.8 | Monomethyl maleate | 5.0 | Diallyl maleate | " | 4.3 | 1.5 | 50 |
| 33 | 94.8 | Monomethyl maleate | 5.0 | Diallybenzene | " | 4.3 | 2 | 48 |
| 34 | 79.8 | Monomethyl maleate | 20 | Diallyl phthalate | " | 17.2 | 1 | 55 |
| 35 | 98.8 | Monomethyl maleate | 1.0 | " | " | 0.9 | 4 | 40 |
| 36 | 94.0 | Monomethyl maleate | 5.0 | Diallyl phthalate | 1.0 | 4.3 | 1 | 52 |
| 37 | 94.95 | Monomethyl maleate | 5.0 | Diallyl phthalate | 0.05 | 4.3 | 2 | 42 |

EXAMPLE 4

Example 3 was repeated except that the compounding recipe shown in Table 6 was used instead of that shown in Table 2. The results are shown in Table 7.

TABLE 6

| Vinyl chloride resin (vinyl chloride 94.8/monomethyl maleate 5.0/diallyl phthalate 0.2) | 100 parts |
|---|---|
| Ionic crosslinking agent | See Table 7 |
| Di-2-ethylhexyl phthalate | 80 parts |
| Dibutyltin maleate | 4 parts |

TABLE 7

| Run No. | Ionic crosslinking agent Type | Amount (parts) | Heat distortion (%) | Rebound (%) |
|---|---|---|---|---|
| Invention |  |  |  |  |
| 38 | Magnesium acetylacetonate | 8.6 | 1.5 | 55 |
| 39 | " | 4.3 | 1.5 | 52 |
| 40 | " | 2.2 | 2 | 45 |
| 41 | Zinc acetylacetonate | 5.1 | 2 | 53 |
| 42 | Calcium stearate | 11.7 | 4 | 49 |
| 43 | Zinc octylate | 6.8 | 3 | 51 |
| 44 | Barium hydroxide | 3.3 | 3 | 47 |
| 45 | Calcium hydroxide | 1.5 | 4 | 45 |
| 46 | Sodium hydroxide | 1.6 | 3 | 43 |
| 47 | Zinc oxide | 1.6 | 4 | 42 |
| Comparison |  |  |  |  |
| 6 | None | — | 11 | 22 |

What is claimed is:

1. A vinyl chloride resin composition comprising (A) a copolymer derived from 70 to 99.8% by weight of vinyl chloride, 0.2 to 30% by weight of a monoester of an alpha,beta-unsaturated dicarboxylic acid, 0 to 2% by weight of a compound having two or more active double bonds in the molecule and 0 to 20% by weight of another vinyl compound, (B) a mono- or divalent metal compound and- (C) a plasticizer.

2. The composition of claim 1 wherein the amount of the mono- or divalent metal compound (B) is 0.1 to 3 molar equivalents per mole of the carboxylic acid in the copolymer (A).

3. The composition of claim 1 wherein the amount of the plasticizer (C) is 20 to 300 parts by weight per 100 parts by weight of the copolymer (A).

4. A vinyl chloride composition comprising (A') a copolymer derived from 70 to 99.8% by weight of vinyl chloride, 0.2 to 28% by weight of a monoester of an alpha,beta-unsaturated dicarboxylic acid, up to 2% by weight of a compound having two or more active double bonds in the molecule and 0 to 20% by weight of another vinyl compound, (B) a mono- or divalent metal compound and (C) a plasticizer.

5. The composition of claim 4 wherein the amount of the mono- or divalent metal compound (B) is 0.1 to 3 molar equivalents per mole of the carboxylic acid in the copolymer (A').

6. The composition of claim 4 wherein the amount of the plasticizer (C) is 20 to 300 parts by weight per 100 parts by weight of the copolymer (A').

7. The composition of claim 1 wherein the plasticizer is selected from one or more members of the group consisting of phthalic acid ester, linear dibasic acid esters, polyester polymeric plasticizers, epoxy plasticizers and phosphate ester plasticizers.

8. The composition of claim 4 wherein the plasticizer is selected from one or more members of the group consisting of phthalic acid esters, linear dibasic esters, polyester polymeric plasticizers, epoxy plasticizers and phosphate ester plasticizers.

9. The composition of claim 1 wherein the monoester of an alpha, beta-unsaturated dicarboxylic acid is selected from the group consisting of monoesters of maleic acid, fumaric acid, itaconic acid and citraconic acid.

10. The composition of claim 4 wherein the monoester of an alpha, beta-unsaturated dicarboxylic acid is selected from the group consisting of monesters of maleic acid, fumaric acid, itaconic acid and citraconic acid.

11. A vinyl chloride resin composition comprising (a) a copolymer derived from 70 to 98.8% by weight of vinyl chloride, 0.2 to 28% by weight or a monoester of an alpha, beta-unsaturated dicarboxylic acid, 0.05 to 2% by weight of a compound having two or more active double bonds in the molecule and 0 to 20% by weight of another vinyl compound, (b) a mono- or divalent metal compound and (c) a plasticizer.

12. The compound of claim 11 wherein the compound having two or more active double bonds in the molecule is selected from the group consisting of diallyl phthalate, diallyl maleate, diallyl adipate, diallyl ether, triallyl cyanurate, ethylene glycol divinyl ether, ethylene glycol dimethacrylate and trimethylol propane trimethacrylate.

* * * * *